US010536468B2

(12) United States Patent
Johnston et al.

(10) Patent No.: US 10,536,468 B2
(45) Date of Patent: Jan. 14, 2020

(54) SYSTEM AND METHOD FOR VOICE SECURITY IN A TELECOMMUNICATIONS NETWORK

(71) Applicant: Level 3 Communications, LLC, Broomfield, CO (US)

(72) Inventors: Dana A. Johnston, Littleton, CO (US); Clyde David Cooper, III, Louisville, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 94 days.

(21) Appl. No.: 15/383,393

(22) Filed: Dec. 19, 2016

(65) Prior Publication Data
US 2018/0026997 A1    Jan. 25, 2018

Related U.S. Application Data

(60) Provisional application No. 62/364,991, filed on Jul. 21, 2016.

(51) Int. Cl.
*H04L 29/06* (2006.01)
*H04M 7/00* (2006.01)

(52) U.S. Cl.
CPC ...... *H04L 63/1416* (2013.01); *H04L 63/1425* (2013.01); *H04L 63/1458* (2013.01); *H04L 63/162* (2013.01); *H04L 63/164* (2013.01); *H04L 63/166* (2013.01);

(Continued)

(58) Field of Classification Search
None
See application file for complete search history.

(56) References Cited

U.S. PATENT DOCUMENTS 7,913,303 B1 *   3/2011   Rouland ............. H04L 63/1433
                                                         726/22
8,892,665 B1 *   11/2014  Rostami-Hesarsorkh ...................
                                                    H04L 29/06557
                                                         709/206

(Continued)

OTHER PUBLICATIONS

Marriam-Webster,"Firewall", author unknown, p. 1, Apr. 24, 2009.*

(Continued)

*Primary Examiner* — Piotr Poltorak

(57) ABSTRACT

Aspects of the present disclosure involve systems, methods, computer program products, and the like, for identifying and mitigating attacks on a voice component of a telecommunications network. In general, the process includes obtaining Layer 3 through Layer 7 transmission information from one or more edge devices to the telecommunications network. In one particular embodiment, a plurality of edge devices (also referred to herein as "session border controllers" or SBCs) is included in the telecommunications network in disparate geographical locations. Each SBC may provide Layer 3 through Layer 7 transmission information for each packet or communication transmitted through the SBC to a local database, which in turn may provide the information to a Central Analysis System or database. In one particular embodiment, the Layer 3 through Layer 7 information includes Session Initiation Protocol routing information for the communications sent to each of the SBCs of the network.

18 Claims, 5 Drawing Sheets

(52) U.S. Cl.
CPC ........ *H04L 63/168* (2013.01); *H04L 65/1006* (2013.01); *H04M 7/006* (2013.01)

(56) References Cited

U.S. PATENT DOCUMENTS

| | | | | |
|---|---|---|---|---|
| 8,955,112 B2* | 2/2015 | Nguyen | ............... | H04L 45/306 726/22 |
| 9,118,711 B2* | 8/2015 | Oliphant | ............... | G06F 16/245 |
| 9,661,011 B1* | 5/2017 | Van Horenbeeck | ............... | H04L 63/1425 |
| 9,992,214 B1* | 6/2018 | Xiao | ............... | H04L 63/1416 |
| 10,019,561 B1* | 7/2018 | Shelton | ............... | G10L 17/00 |
| 10,038,714 B2* | 7/2018 | Waters, Jr. | ............... | H04L 63/1458 |
| 10,069,823 B1* | 9/2018 | Chong | ............... | H04L 63/0853 |
| 2002/0055912 A1* | 5/2002 | Buck | ............... | G06Q 20/3821 705/76 |
| 2002/0129140 A1* | 9/2002 | Peled | ............... | H04L 63/0245 709/224 |
| 2003/0140250 A1* | 7/2003 | Taninaka | ............... | G06F 21/577 726/25 |
| 2003/0154399 A1* | 8/2003 | Zuk | ............... | H04L 63/0254 726/11 |
| 2003/0204632 A1* | 10/2003 | Willebeek-LeMair | ............... | H04L 29/06 709/249 |
| 2004/0088571 A1* | 5/2004 | Jerrim | ............... | G06F 21/552 726/1 |
| 2004/0098484 A1* | 5/2004 | Wuebker | ............... | H04L 63/02 709/227 |
| 2004/0128554 A1* | 7/2004 | Maher, III | ............... | H04L 29/12471 726/11 |
| 2004/0250124 A1* | 12/2004 | Chesla | ............... | G06F 21/552 726/13 |
| 2005/0022022 A1* | 1/2005 | Mendonca | ............... | G06F 21/55 726/4 |
| 2005/0076245 A1* | 4/2005 | Graham | ............... | G06F 21/552 726/4 |
| 2006/0026669 A1* | 2/2006 | Zakas | ............... | H04L 29/06 726/6 |
| 2006/0048142 A1* | 3/2006 | Roese | ............... | H04L 41/0893 717/176 |
| 2006/0075093 A1* | 4/2006 | Frattura | ............... | H04L 41/0681 709/224 |
| 2006/0161816 A1* | 7/2006 | Gula | ............... | H04L 41/065 714/39 |
| 2006/0174342 A1* | 8/2006 | Zaheer | ............... | G06F 21/56 726/23 |
| 2006/0236402 A1* | 10/2006 | Russell | ............... | H04L 63/1458 726/25 |
| 2006/0282895 A1* | 12/2006 | Rentzis | ............... | G06F 21/56 726/24 |
| 2006/0294579 A1 | 12/2006 | Khuti et al. | | |
| 2007/0124803 A1* | 5/2007 | Taraz | ............... | G06F 21/577 726/4 |
| 2007/0192863 A1* | 8/2007 | Kapoor | ............... | G06F 9/505 726/23 |
| 2008/0134296 A1* | 6/2008 | Amitai | ............... | H04L 63/102 726/4 |
| 2008/0141374 A1* | 6/2008 | Sidiroglou | ............... | G06F 21/554 726/23 |
| 2008/0209554 A1* | 8/2008 | Lee | ............... | H04L 51/12 726/22 |
| 2009/0006856 A1* | 1/2009 | Abraham | ............... | G06F 21/55 713/183 |
| 2009/0070880 A1* | 3/2009 | Harris | ............... | G06F 21/552 726/25 |
| 2009/0083422 A1* | 3/2009 | McKay | ............... | H04L 63/0272 709/225 |
| 2009/0232361 A1* | 9/2009 | Miller | ............... | G06K 9/00892 382/115 |
| 2009/0325615 A1* | 12/2009 | McKay | ............... | H04L 63/02 455/466 |
| 2010/0306847 A1* | 12/2010 | Lambert | ............... | G06F 21/552 726/24 |
| 2012/0204261 A1* | 8/2012 | Mantripragada | ............... | H04L 12/66 726/22 |
| 2012/0233311 A1* | 9/2012 | Parker | ............... | H04L 43/00 709/224 |
| 2013/0312097 A1* | 11/2013 | Turnbull | ............... | G06F 21/55 726/24 |
| 2014/0013434 A1* | 1/2014 | Ranum | ............... | H04L 63/145 726/24 |
| 2014/0096251 A1* | 4/2014 | Doctor | ............... | H04L 63/1408 726/23 |
| 2015/0033287 A1* | 1/2015 | Oliphant | ............... | G06F 16/245 726/1 |
| 2015/0033340 A1* | 1/2015 | Giokas | ............... | H04L 63/1433 726/23 |
| 2015/0040233 A1* | 2/2015 | Oliphant | ............... | H04L 63/1441 726/25 |
| 2015/0121529 A1* | 4/2015 | Quinlan | ............... | H04L 63/1491 726/23 |
| 2015/0271142 A1* | 9/2015 | Oliphant | ............... | G06F 16/245 726/12 |
| 2015/0271193 A1* | 9/2015 | Estes | ............... | H04L 63/1416 726/23 |
| 2016/0088000 A1* | 3/2016 | Siva Kumar | ............... | H04L 63/083 726/23 |
| 2016/0173529 A1* | 6/2016 | Baig | ............... | H04L 63/1458 726/13 |
| 2016/0182512 A1* | 6/2016 | Chastain | ............... | H04W 12/06 713/170 |
| 2016/0323301 A1* | 11/2016 | Boss | ............... | H04L 63/1416 |
| 2017/0013002 A1* | 1/2017 | Stevenson | ............... | H04L 63/1433 |
| 2018/0026997 A1* | 1/2018 | Johnston | ............... | H04L 63/1416 726/23 |
| 2018/0069885 A1* | 3/2018 | Patterson | ............... | G06F 17/30283 |
| 2018/0091393 A1* | 3/2018 | He | ............... | H04L 43/065 |

OTHER PUBLICATIONS

Wikipedia, "Telecommunication", author unknown, p. 1-3, Feb. 15, 2005.*
International Search Report dated Mar. 27, 2017, Int'l Appl. No. PCT/US16/067518, Int'l Filing Date Dec. 19, 2016; 3 pgs.
Written Opinion of the International Searching Authority dated Mar. 27, 2017, Int'l Appl. No. PCT/US16/067518, Int'l Filing Date Dec. 19, 2016; 9 pgs.
International Preliminary Report on Patentability, dated Jan. 22, 2019, Int'l Appl. No. PCT/US16/067518, Int'l Filing Date Dec. 19, 2016; 11 pgs.

* cited by examiner

SYSTEM AND METHOD FOR VOICE SECURITY IN A TELECOMMUNICATIONS NETWORK

CROSS-REFERENCE TO RELATED APPLICATIONS

This application is related to and claims priority under 35 U.S.C. § 119(e) from U.S. Patent Application No. 62/364,991, filed Jul. 21, 2016, titled "SYSTEM AND METHOD FOR VOICE SECURITY IN A TELECOMMUNICATIONS NETWORK," the entire content of which is incorporated herein by reference for all purposes.

TECHNICAL FIELD

Aspects of the present invention generally relate to systems and methods for implementing a telecommunications network, and more specifically for identifying and mitigating attacks on a networking component of a telecommunications network.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide Internet access to the customers of the network. Such services are typically requested by the customer to be provided by the network.

In some instances, telecommunications networks may suffer an attack by an actor to gain access to the network or to disrupt the operation of the network. Attacks on the network may take many forms, including disruptive attacks, penetration attacks, and/or fraudulent access of the network. For example, one type of disruption attack on the voice network includes a Distributed Denial Of Service (DDOS) attack from one or more source devices. In general, a DDOS attack occurs when an actor floods the network with requests to a particular destination device in an attempt to overwhelm the device and block legitimate communications from legitimate sources. Penetration attacks are designed to gain access to the services provided by the network without paying for such services. Such an attack may include attempting to guess or otherwise access usernames or passwords of network users or exploiting system vulnerabilities to gain access to services of the network. Yet another type of attack includes an actor accessing a customer account and using the customer's access to obtain services from the network. Any or all of these attacks may disrupt the operation of the telecommunications network.

Previous systems to provide security against such attacks on the voice IP network are generally ineffective against all types of attacks. For example, a DDOS attack may be detected by a security protocol for the network, but such systems typically do not detect penetration or fraud attacks. Further, many network attacks may only be detected locally such that an actor may attack the network at geographically diverse locations to make detection of the attack even more difficult for the network.

It is with these and other issues in mind that various aspects of the present disclosure were developed.

SUMMARY

One implementation of the present disclosure may take the form of a telecommunication network comprising a first routing device in communication with a first client network, a second routing device in communication with a second client network or the first client network, and a central analysis system comprising a database of transmission fingerprints of security attacks on the telecommunications network. The central analysis system of the telecommunication network is configured to receive Layer 3 through Layer 7 signaling message transmission information of a first communication transmitted to the first routing device and a second communication transmitted to the second routing device, compare the Layer 3 through Layer 7 transmission information of the first communication and the second communication to a stored transmission signature in the database, and detect a security attack on the telecommunications network when the Layer 3 through Layer 7 transmission information from the first device and the second device or other multiple devices in the network matches the stored transmission signature in the database. In addition, the central analysis system is also configured to generate at least one mitigating instruction in response to the detected security attack on the telecommunications network, the mitigating instruction including Layer 3 through Layer 7 transmission information for routing a received communication and transmit the at least one mitigating instruction to at least one routing device along a transmission path of the security attack on the telecommunications network.

Another implementation of the present disclosure may take the form of a method for managing a telecommunications network. The method includes the operations of receiving Layer 3 through Layer 7 transmission information of a first communication from a first device of a telecommunications network in a first metro area and a second communication from a second device of the telecommunications network in a second metro area different than the first metro area and analyzing the received Layer 3 through Layer 7 transmission information to detect a transmission fingerprint of a security attack on the telecommunications network. The method may also include the operations of generating at least one mitigating instruction in response to the determined security attack on the telecommunications network, the mitigating instruction including Layer 3 through Layer 7 transmission information for routing a received communication and transmitting at least one mitigating instruction to at least one routing device along a transmission path of the security attack on the telecommunications network.

Yet another implementation of the present disclosure may take the form of a telecommunication device. The device may include at least one communication port for communicating with a first routing device located in a first metro area and a second routing device located in a second metro area different than the first metro area, a processing device and a computer-readable medium connected to the processing device configured to store instructions. The instructions, when executed by the processing device, perform the operations of receiving Layer 3 through Layer 7 transmission information of a first communication from the first routing device and a second communication from the second routing device, comparing the Layer 3 through Layer 7 transmission information of the first communication and the second communication to a stored transmission fingerprint in a database in communication with the at least one processing device, and detecting a security attack on the telecommunications network when the Layer 3 through Layer 7 transmission information of the first communication and the second communication matches the stored transmission fingerprint in the database. The instructions may also perform generating at least one mitigating instruction in response to the detected security attack on the telecommunications network, the mitigating instruction including Layer 3 through Layer 7 transmission information for routing a received communication and transmitting the at least one mitigating instruction to at least one routing device along a transmission path of the security attack on the telecommunications network.

DETAILED DESCRIPTION

Figure 1:
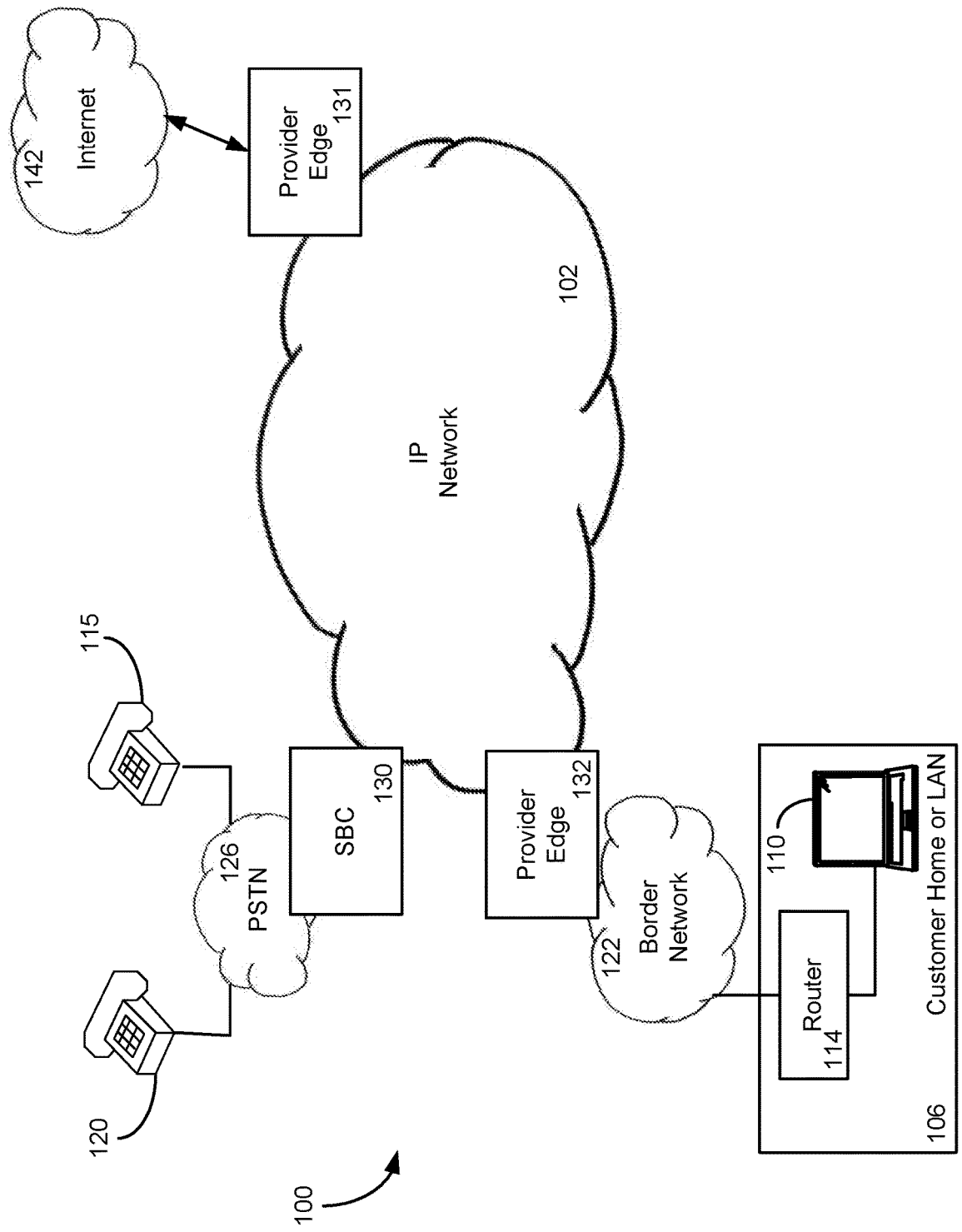
FIG. 1 schematic diagram illustrating an exemplary Internet Protocol (IP) operating environment in accordance with one embodiment.

Aspects of the present disclosure involve systems, methods, computer program products, and the like, for identifying and mitigating attacks on a networking component of a telecommunications network. In general, the process includes obtaining Layer 3 or above transmission information from one or more edge devices to the telecommunications network. In one particular embodiment, a plurality of edge devices (also referred to herein as "session border controllers" or SBCs) is included in the telecommunications network in disparate geographical locations. Each SBC may provide Layer 3 or above transmission information for each packet or communication transmitted through the SBC to a local database, which in turn may provide the information to a Central Analysis System (CAS) or database. In one particular embodiment, the Layer 3 information and above includes Session Initiation Protocol (SIP) routing information for the communications sent to each of the SBCs of the network.

Once the Layer 3 through Layer 7 information is received, the CAS analyzes the transmission information to detect potential attacks against the networking component of the network. In particular, the CAS may extract the Layer 3 through Layer 7 information and analyze it to determine a protocol or fingerprint associated with one or more attacks on the Internet Protocol (IP) voice network. For example, one such attack on the voice network includes a Distributed Denial Of Service (DDOS) attack from a particular IP address. Through the analysis of the Layer 3 through Layer 7 information, the CAS may determine a signaling signature of requests associated with the DDOS attack and, as explained in more detail below, execute one or more mitigating procedures to deny or refute the attack. In general, the analysis of the centrally gathered Layer 3 through Layer 7 information allows the CAS to detect many types of attacks or fraudulent behaviors on the IP voice network, from a plurality of geographically distributed sources. Further, in some embodiments, the CAS may utilize machine-learning techniques to identify such attacks as the attacks are occurring and execute one or more mitigating procedures.

During an attack on the network detected by the CAS, the CAS may institute several mitigating procedures to deny further harm to the network from the attack. Such mitigating procedures may include providing mitigating instructions to one or more of the SBCs of the network, providing mitigating instructions to one or more customer networks and/or routing devices in the customer network, and/or providing mitigating instructions to networking devices within the telecommunications network. In general, the mitigating instructions is provided to reroute, bandwidth limit, or deny the transmission of communications through the various networks based on the analysis of the Layer 3 through Layer 7 routing information provided to the CAS. For example, a particular IP address may be identified by the CAS as the source of an attack on the telecommunications network. The mitigating instructions provided to the customer network, SBC, and/or the network may instruct the intermediate devices within the networks to reroute, bandwidth limit, or deny communications from that particular IP address. Further, because the mitigation instructions provided as a mitigation procedure is based on Layer 3 through Layer 7 information, the mitigating procedures may be targeted such that some packets from the identified IP source are allowed, while other packets are denied. In this manner, a SIP-level or Layer 3 through Layer 7 identification of a type of attack on the network is identified and one or more mitigating procedures may be executed to prevent further attacks on the network.

FIG. 1 illustrates a general operating environment 100 for processing communications between users of a telecommunications network. In general, the environment 100 provides for establishing communication sessions between network users and for providing one or more network services to network users. For example, voice communications may be provided to and/or from one or more customers of the network through the operating environment 100 discussed herein. With specific reference to FIG. 1, the environment 100 includes an IP network 102, which may be provided by a wholesale network service provider. However, while the environment 100 of FIG. 1 shows a configuration using the IP network 102; it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The IP network 102 includes numerous components such as, but not limited to gateways, routers, and registrars, which enable communication and/or provides services across the IP network 102, but are not shown or described in detail here because those skilled in the art will readily understand these components. More relevant to this description is the interaction and communication between the IP network 102 and other entities, such as the one or more customer home or business local area networks (LANs) 106, where a user of the network will connect with the network.

Customer network 106 can include communication devices such as, but not limited to, a personal computer or a telephone 110 connected to a router/firewall 114. In some instances where the customer 106 includes several communication devices, such devices may connect to through a private branch exchange (PBX). Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the IP network 102 to other communication devices, such as another customer network 126 and/or the Internet 142. Components of the customer network 106 are typically home- or business-based, but they can be relocated and may be designed for easy portability. For example, the communication device 110 may be wireless (e.g., cellular) telephone, smart phone, tablet or portable laptop computer. In some embodiments, multiple communication devices in diverse locations that are owned or operated by a particular entity or customer may be connected through the IP network 102.

The customer network 106 typically connects to the IP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the IP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the IP Network 102 through a Session Border Controller (SBC) 130 or provider edge 132, 131. For ease of instruction, only three communication devices 110, 115, 120 are shown communicating with the IP network 102; however, numerous such devices, and other devices, may be connected with the network, which is equipped to handle enormous numbers of simultaneous calls and/or other IP-based communications.

Figure 2:
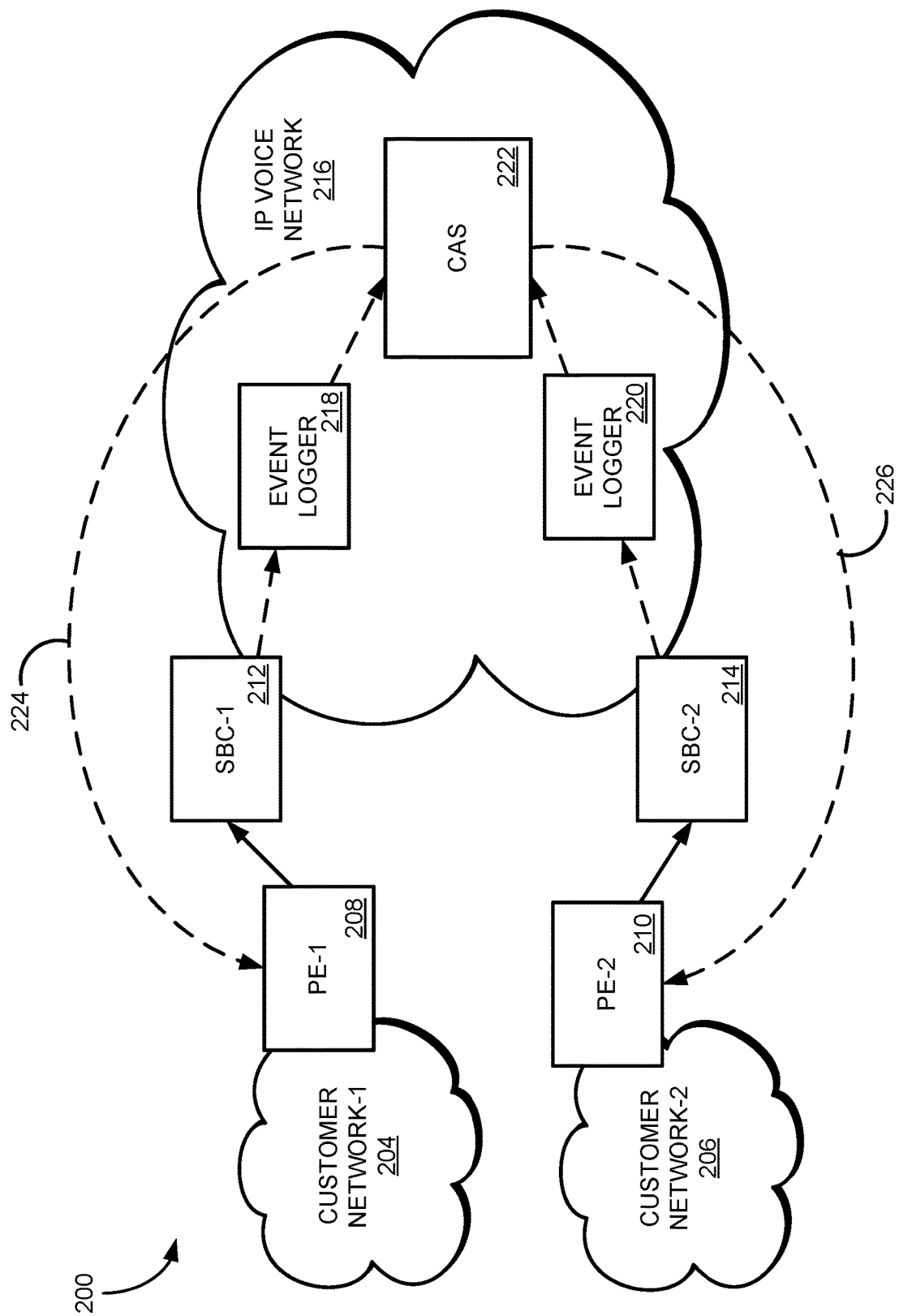
FIG. 2 is a schematic diagram illustrating a first particular network environment to obtain network traffic information at a centralized database from multiple border components and mitigate potential attacks on a voice component of a telecommunications network.

As mentioned above, the telecommunications network provides an interface for customers to the network to exchange communications. In particular, FIG. 2 is a schematic diagram 200 illustrating a first particular network environment to obtain network traffic information at a centralized database and mitigate potential attacks on a voice component of a telecommunications network. The IP voice telecommunications network 216 of FIG. 2 may be similar to that of FIG. 1 such that the networks may include the same or similar components. Further, client networks 204, 206 connected to the telecommunications network 202 may utilize the network to send and receive packets of information to/from other customers to the network.

As shown in FIG. 2, a client network (CN-1 204) connects to the network 216 through multiple components. In particular, CN-1 204 connects to the network 216 through provider edge 1 208, although it should be appreciated that CN-1 may include any number of provider edge devices to connect to the IP voice network. Further still, the provider edge 208 of CN-1 204 communicates with SBC-1 212 associated with the IP voice network 216 to access the network and provide communication packets to the network. Although not shown, several customer networks may connect to a single SBC 212 to access the IP voice network 216 through one or more provider edge devices.

In a similar manner, a second customer network (CN-2 206) utilizes a second provider edge device (PE-2 210) and a second SBC (SBC-2 214 associated with the network 216) to access and communicate with the IP voice network. In one particular example, CN-1 204 may connect to SBC-1 212 in a first geographic location while CN-2 206 connects to SBC-2 214 in a second geographic location. In other words, each SBC of the network 216 may be geographically separate to provide ingress points into the network 216 that are closer in distance to the provider edge devices of the customer networks. In other embodiments, the SBCs 212, 214 of the network 216 may be geographically near each other, but separated logically in relation to the flow of traffic to/from the network. In one particular example, PE-1 208 of customer network-1 204 and SBC-1 212 may be located in or around San Francisco, Calif., while PE-2 210 of customer network-2 206 and SBC-2 214 are located in Dallas, Tex., although the devices may be located in any geographic location.

In general, users of the customer networks 204, 206 connect to and utilize the IP voice network 216 to communicate with other users. To establish the voice connection to other users, communications are sent to the associated provider edge 208, 210 and SBC 212, 214 to connect to the voice network, over which a communication session between the users may occur. In one particular embodiment of the network 200, the devices of the customer networks 204, 206 and the IP voice network 216 may utilize SIP protocols to establish the communication session. The SIP protocol is, in general, an application layer protocol for establishing communication sessions between two or more communication devices over a network. However, any type of communication protocol may be utilized in establishing the communication session between the users of the network 216. Further, the Open Systems Interconnection (OSI) model is used herein to discuss the abstraction layers of the communication systems of the network 216. Those of ordinary skill in the art will understand the OSI model discussed herein, and in particular the different abstraction layers of the communication and network systems. In more detail, the devices and methods discussed herein include Layer 4 (otherwise known as the "transport layer") and above of the OSI model of communication systems. For simplicity, discussion of Layer 4 or transport layer information of a communication may include Layer 3 through Layer 7 information. Thus, although it may not be explicitly stated, the use of "Layer 3" information as used herein may also include information above the Layer 3 level.

Once the communication session is established between the users of the network 216, voice packets may be exchanged between the connected devices. The transmission of the communication packets and session establishing requests is illustrated in FIG. 2 through the solid lines between the provider edges 208, 210 and the respective SBCs 212, 214. It should be appreciated that the SBCs 212, 214 may further communicate or otherwise transmit communication packets to other routing or telecommunication devices within the voice IP network 216 to connect the users in the communication session. Similarly, each customer network 204, 206 also include routing or telecommunication devices that are included in the communication session to transmit the communication packets. However, in order to keep the illustration of FIG. 2 clear, the connections between routing devices within the networks 216, 204, 206 are not illustrated but should be understood.

In addition to establishing the communication session between the users, the SBCs 212, 214 of the network 216 may also provide connecting information to one or more databases of the network. For example, an event logger 218 may be associated with each SBC of the network 216 to collect and record requests and communication packets transmitted to the respective SBC. As shown in FIG. 2, event logger 218 receives and records routing information from SBC-1 212 while event logger 220 receives and records routing information from SBC-2 214. Thus, an event logger device 218, 220 may be associated with a similarly geographically-located SBC device 212, 214. In general, any communication or routing information received at the SBC 212, 214 may be logged by the associated event logger 218, 220. For example, SBC-1 212 may receive a SIP request from PE-1 208 to establish a communication session through the IP voice network 216. This SIP request may be provided to the associated event logger 218 for storing. Any responses provided by the SBC 212 may also be tracked and stored by the event logger 218. Other activities of admission control into the SBC 212, 214 of the network 216 may also be obtained and stored, such as SIP invites, SIP requests, authentication information, call agent identification information, customer reported fraud information, etc. Also, such routing information may also include any information included in each of the layers of the communication protocol used by the network 216, and in particular, Layer 3 through Layer 7 routing information. Further, although illustrated in FIG. 2 as being included in the IP voice network 216, the event loggers 218, 220 may be separate from the network. In general, the event loggers 218, 220 are simply in communication with the associated SBC device 212, 214 to receive the routing and communication information.

Each event logger 218, 220 receives connection and routing information from an SBC at a geographic location. As such, the event loggers 218, 220 may not be aware or have access to the routing information stored at other event loggers of the network 216. Thus, the network 216 may also include a central analysis system (CAS) or database 222 in communication with the event loggers 218, 220 to receive the information obtained by each of the event loggers 218, 220. Through the CAS 222, the routing information received at the disparately located SBCs 212, 214 of the network 216 may be gathered or received at a centralized location or database for processing by the IP voice network 216. Similar to the event loggers 218, 220, the CAS 222 may or may not be included in the network 216. The CAS 222 may receive and store the routing information from the event loggers 218, 220 of the network 216. Thus, all of the routing or communication information received at the voice IP network 216 to each of the SBCs 212, 214 may be centralized and stored. The operations of the CAS 222 executed in response to receiving the routing information from the event loggers 218, 220 is discussed in more detail below.

Figure 3:
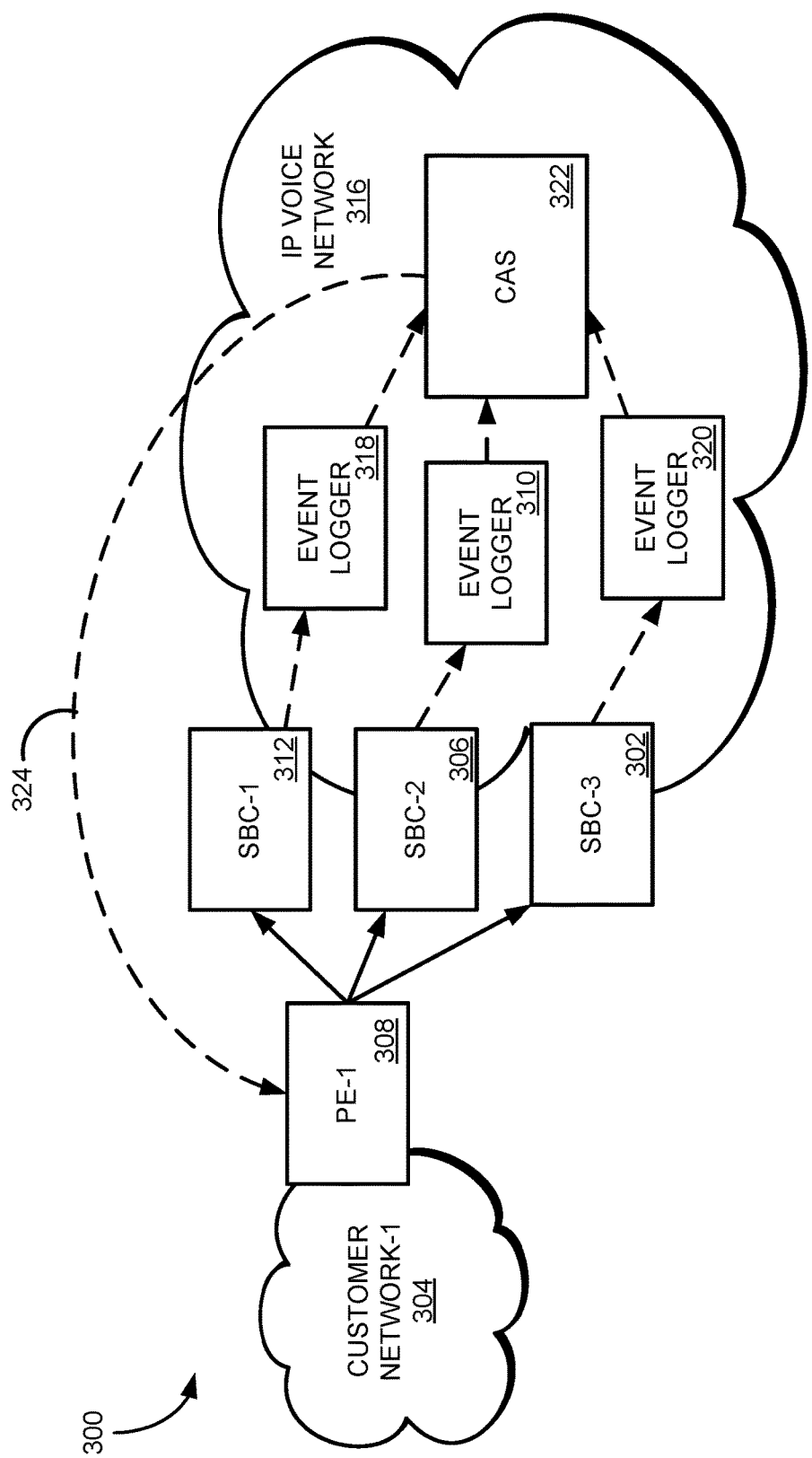
FIG. 3 is a schematic diagram illustrating a second particular network environment to obtain network traffic information at a centralized database from multiple border components and mitigate potential attacks on a voice component of a telecommunications network.

A similar network environment that may be utilized for the systems and methods described herein is illustrated in FIG. 3. In particular, FIG. 3 is a schematic diagram illustrating a second particular network environment 300 to obtain network traffic information at a centralized database from multiple border components and mitigate potential attacks on a voice component of a telecommunications network. The components of the network environment 300 are similar to that described above with relation to FIG. 2. Thus, the network 300 includes a customer network 304 that accesses or otherwise communications with a telecommunications network 316 through a provider edge 308. However, in this example, the provider edge 308 communicates with multiple SBCs to provide communication packets to the network 316.

In particular, PE-1 308 is connected to or otherwise communicates with SBC-1 312, SBC-2 306, and SBC-3 302 to provide received communications to the network 316, or to receive communications from the network. The particular SBC that the PE 3-8 transmits a received communication to is determined by one or more routing decisions at the PE or customer network 304. Also similar to above, each SBC may have an associated event logger to receive connection and routing information from a corresponding SBC. In particular, SBC-1 312 connects to event logger 318, SBC-2 306 connects to event logger 310, and SBC-3 302 connects to event logger 320. Also similar to that described above, each event logger of the network 300 may provide the received information to a CAS 322 that is a part of the network. This information, as described below, may be utilized by the CAS 322 and/or the network 316 to detect and respond to a potential attack on the network. In this manner, attacks received from one customer network 304 through multiple SBC may be detected and responded to as described in more detail below.

Figure 4:
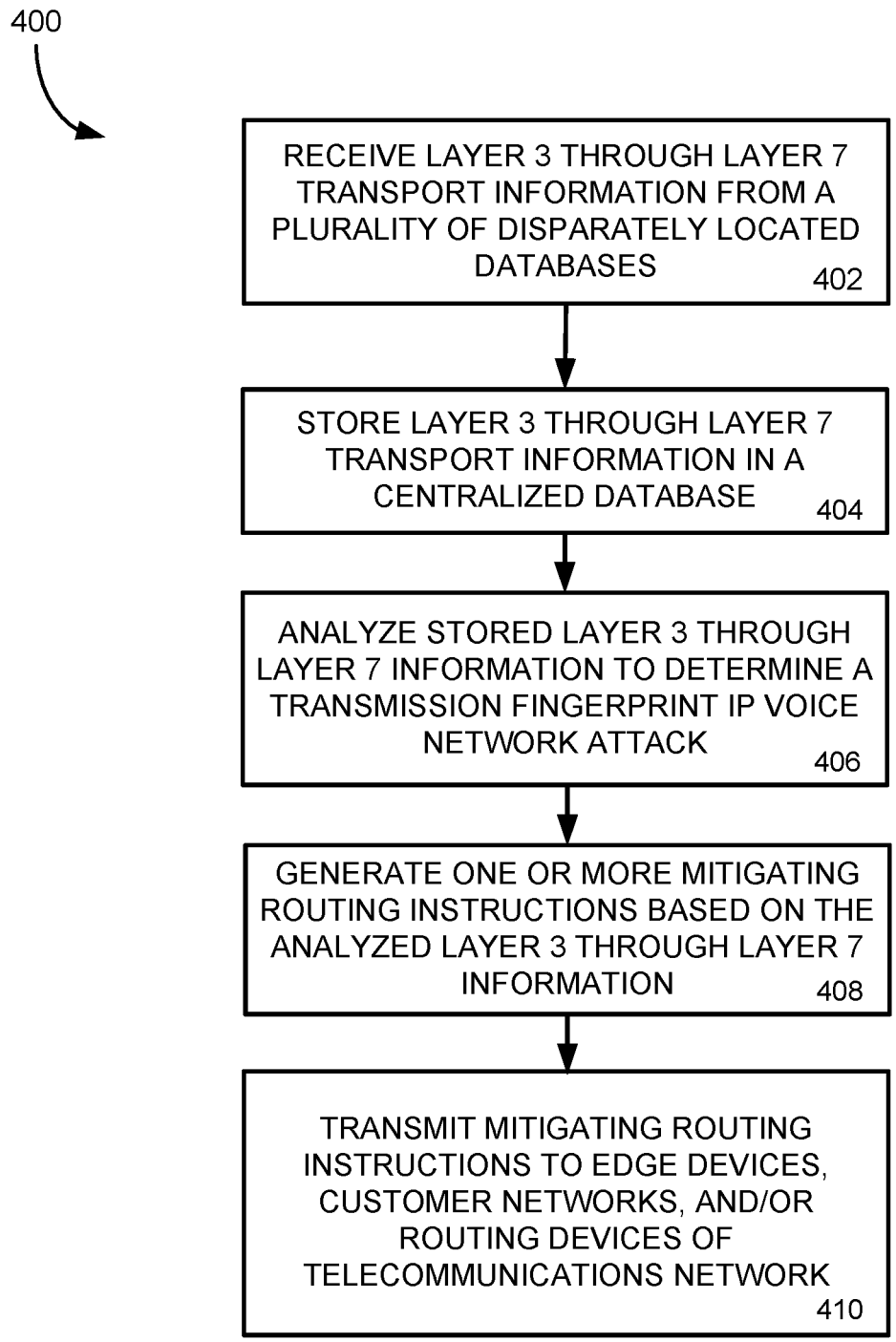
FIG. 4 is a flowchart illustrating a method for a telecommunications network to detect a potential attack on the telecommunications network and execute one or more mitigating procedures against the potential attack.

Through the network architecture 200 of FIG. 2 and/or the network architecture 300 of FIG. 3, the network may address potential security attacks directed at the voice IP network. In particular, FIG. 4 is a flowchart illustrating a method 400 for a telecommunications network to detect a potential attack on the telecommunications network and execute one or more mitigating procedures against the potential attack. Although described herein in relation to the network configuration 200 of FIG. 2, it should be appreciated that the same or similar description of the operations of the method 400 may also be applied in the network architecture 300 of FIG. 3.

In general, the operations of the method 400 may be performed by the CAS 222 of the network 216. In some instances, the CAS 222 may be an application server within the network 216. In other instances, the CAS 22 may be embodied on several computing devices. Regardless of the implementations used, the CAS 222 may perform the operations of the method 400 to detect a potential security attack on the voice IP network 216 and execute one or more mitigating procedures to combat or counter-act the detected attack.

Beginning in operation 402, the CAS 222 receives Layer 3 through Layer 7 transport information from a plurality of disparately located databases. In one example, the CAS 222 receives the Layer 3 through Layer 7 routing information from the event loggers 218, 220 associated with the SBCs 212, 214 of the network 216. Because the SBCs 212, 214 are the access points for the network 216, the CAS 222 receives routing information (including requests to enter the network) for the entire network in a centralized location or device. This received Layer 3 through Layer 7 transport information is stored in the CAS 222 in operation 404. In one particular embodiment, the Layer 3 through Layer 7 information that is stored by the CAS 222 includes SIP routing information for each SIP request received at the IP voice network 216.

In operation 406, the stored information is analyzed to determine a transport information fingerprint or structure of a potential security attack on the IP voice network 216. Attacks on voice IP networks 216 occur in many ways. For example, a first type of attack on a voice IP network may focus on the discovering vulnerabilities in a transport Layer 4 and below. Such attacks include DDOS attacks, TCP syn floods, and other types of disruptive attacks that attempt to overload a network or network device by bombarding the network with requests for communication sessions. If a high volume of such requests are received at once, the network devices may become overloaded and prevent legitimate traffic from accessing the network devices. Another type of attack on a voice IP network 216 is a penetration attack, directed at vulnerabilities in transport Layer 3 through Layer 7. Such attacks are designed to gain access to the network 216 to steal or use network services without paying the network administrator for such services. For example, an attack may attempt to guess one or more authentication criteria for using the network and, upon providing a correct authentication guess, utilize the network services free of charge. Other types of penetration attacks include accessing services within the network 216 to disrupt or disable such services from being used by the customers of the network.

Yet another type of attack on voice IP networks 216 includes fraud-type security attacks. Generally, fraud attacks occur once a customer's voice system has been compromised and an attacker utilizes the customer's voice system to perpetuate the attack. For example, an attacker may access a customer's voice system to initiate international calls that are then charged to the customer, rather than the attacker. In another example, an attacker may hack into a voice response unit (VRU) to initiate calls from the voice IP network at no cost to the attacker. In yet another example, a call center may be attacked by manipulating the network 216 to fill all of the available call paths to the call center such that no legitimate call to the call center is received. Regardless of the type of fraud attack on the voice IP network 216, such attacks are detrimental to the network administrator, the network performance, and the customers of the network.

Previous systems to provide security against such attacks on the voice IP network 216 generally only looked at transport information at Layer 4 or below and could typically only be applied or conducted in a local region. For example, a DDOS attack may be detected at an SBC 212 of the network 216 and, based on an analysis of the Layer 4 or below information being received at the SBC, the attack traffic may be redirected to a local scrubbing center to be cleaned and sent back to the customer. However, such systems typically do not detect penetration or fraud attacks, nor could they detect when such attacks occurred at multiple SBCs of the network 216. Rather, each SBC would perform the analysis and scrubbing independent of the other potential attacks detected at other SBCs of the network 216. Further, many SBCs of the network 216 simply could not prevent successful penetration or fraud attacks on the network 216.

In contrast, the system 200 of FIG. 2 may greatly improve a voice IP network's 216 security and attack mitigation. As mentioned above, the CAS 222 may analyze Layer 3 through Layer 7 information received from each of the event loggers 218, 220 of the network 216 to attempt to identify attacks on the network. By collecting Layer 3 through Layer 7 information in a centralized location or device, the network 216 may better detect potential attacks on the network. For example, previous security systems of the network 216 only analyze Layer 4 and below information such that, typically, only disruptive attacks (such as DDOS attacks) are detected by the system. By collecting Layer 3 through Layer 7 information at the CAS 222, more sophisticated attacks, like penetration or fraud attacks, on the network 216 may be detected through an analysis of the Layer 3 through Layer 7 information. Also, because the collected transport information is from each event logger 218, 220 of the network 216, attacks occurring at multiple geographic locations (or on multiple SBCs 212, 214 of the network) may be detected through an analysis of the collected information. Previous security systems did not centrally locate the transport information such that detection of a potential attack on the network 216 occurred locally to each SBC device. In this manner, the CAS 222 provides a larger and more diverse collection of transport information from which potential attacks on the network 216 may be derived or detected.

Through the analysis of the stored information, the CAS 222 may begin to identify certain aspects of indications of an occurring or previous attack on the network 216. For example, an analysis of the information may indicate that a non-authentication type of SIP request was received from the same source device or IP address at two or more SBCs 212, 214 of the network 216 within a short period of time (such as within 20 ms). Such an occurrence of received SIP requests may indicate that the source IP address is attempting to overload some components of the network 216. Further, the general geographic location of each of the SBCs 212, 214 of the network 216 may be known by the CAS 222 and may further indicate that an attack is occurring on the network, such as if the same SIP request is received at an SBC in Dallas, Tex. and in London, England. As it is unlikely that a legitimate SIP request would be received at the network in such diverse locations, the occurrence of the same SIP request at the SBCs of the network may indicate a potential attack on the network. Further, because the CAS 222 has access to the information contained within the SIP requests, the CAS may develop or determine a SIP request fingerprint (such as a SIP request from a particular source IP address to a particular destination source IP address requesting a particular service) and begin monitoring for the receipt of the same fingerprint. In other words, the CAS 222 may determine that an attack is happening because the same SIP request with the same information is received at different SBCs 212, 214 of the network. As explained in more detail below, this fingerprint may be used to mitigate the attack on the network.

In another example, multiple SBCs 212, 214 of the network 216 may receive SIP requests that include authentication information, such as a username and/or password used to gain access to the network. However, during a security attack on the network, an attacker may attempt to guess a valid username and/or password to access the network 216. This often occurs multiple times to allow the attacker more guesses at a valid username or password. In some instances, the attacker attempts to hide this fraud attempt by transmitting the SIP requests with the guessed username or password at different SBC devices of the network 216. However, because each SBC 212, 214 of the network 216 provides the SIP request information to the CAS 222, the CAS may detect the multiple attempts to access the network from the attacker. In other words, the CAS 222 may analyze the SIP requests from the multiple SBCs 212, 214 and determine that multiple attempts to access the network that include different usernames and/or passwords are received from the same source. In some instances, this analysis determines that the username and password guesses are similar, such as by incrementing a numerical value in the username or password, or changing one value within the supplied username or password from one guess to the next. In other instances, the CAS 222 may determine that the several attempts at authentication with the network from the attacking source occur within a particular timeframe, such as within 20 ms, that further indicates a coordinated attack from an attacking source. Regardless of the parameters used to determine that an attack is occurring or has occurred on the network 216, the CAS 222 utilizes the Layer 3 through Layer 7 information received from each of the disparately geographically located SBC devices to receive a better understanding of the requests made at the network than over previous IP voice network security systems.

In one embodiment, the CAS 222 may utilize one or more machine learning mechanisms or techniques when analyzing the Layer 3 through Layer 7 routing information received from the event loggers 218, 220 to determine a fingerprint of an attack on the network 216. For example, a type of attack (such as a fraud attack like that described above where multiple usernames and/or passwords are used to gain access to the network) may be detected after the attack occurs through the analysis of the routing information. The CAS 222 may then be configured to search for a similar manner of SIP requests from a source device or IP address. When a similar signaling "fingerprint" is observed, the CAS 222 may determine that a particular type of security attack is occurring on the network 216. Similarly, known source IP addresses or devices that have previously perpetrated an attack on the network 216 may be stored so that the CAS 222 may treat additional requests from the noted IP address as suspect. In general, any type of machine learning may be utilized to improve the detection of attacks on the network 216. As more and more attacks are attempted at the network 216, signaling information that goes into creating a fingerprint of potential attacks may be improved and may include any information contained in requests to the network, such as a source IP address, a destination IP address, a geographic location of the source device, a relationship between various destination IP addresses or device, and the like.

Returning to the method 400 of FIG. 4, the CAS 222 may generate one or more mitigating instructions to counteract a detected attack on the network 216 in operation 408. In general, the mitigating instructions operate to instruct a networking device to reroute, bandwidth limit or deny traffic associated with a detected attack from accessing the voice IP network 216. For example, the mitigating instructions may instruct a routing device that receives a communication packet associated with the attack to drop or terminate the packet. In another example, the routing device may be instructed to reroute the communication packet to a firewall-type networking device to clean or scrub the communication packet. This redirecting to the firewall device may allow proper communication packets to be transmitted to the network 216, while packets associated with the attack (as based on the signaling fingerprint of the attack) are dropped or terminated. In yet another example, the routing device may be instructed to bandwidth limit the communication packet to a configurable traffic rate that may reduce the impact of the packet on the network 216.

In operation 410, the CAS 222 transmits the generated mitigating routing instructions to one or more networking routing devices to address the detected security attack on the telecommunications network 216. In one embodiment, the CAS 222 utilizes the IP voice network 216 to transmit the mitigating instructions. In other embodiments, however, the mitigating instructions are provided over any telecommunications network. Further, the mitigating instructions may be generated to be applied at any device along the transmission path of the attack. For example, the mitigating instructions may instruct the SBCs 212, 214 of the network 216 to reroute, bandwidth limit, or deny the attack communications to prevent the attack from accessing the IP voice network 216. In another example, the mitigating instructions may be provided to a routing device within the IP voice network 216, such as a central routing engine. This embodiment may, in particular, be used when the voice network 216 uses PSTN routing for voice communications. The network 216 may utilize the routing device when a SIP request for routing a voice communication is received to determine how the communication is routed through the network. Because the CAS 222 may generate mitigating instructions at the SIP layer (Layer 3 or above), the mitigating instruction may be provided to the routing engine of the network 216 for future SIP-based routing of communications through the network 216. In this manner, mitigation of a detected attack on the network 216 occurs within the network itself.

In one particular embodiment, the mitigating instructions are transmitted to one or more networking devices of the customer network or networks from which the attack is occurring (as shown by transmission arrows 224, 226 of the network environment 200 of FIG. 2). Although illustrated in FIG. 2 as being transmitted to the PE 208, 210 of the associated customer networks 204, 206, the mitigating instructions may be transmitted to any device of the customer network. By applying the mitigating procedures to one or more devices before the IP voice network 216, the SBCs 212, 214 of the network may be saved from applying all of the mitigating procedures. In other words, the load on the devices of the IP voice network 216 may be lessened through the mitigation of the attack closer to the source of the attack. This mitigation along the transmission route of the communications used in the attack is possible because the CAS 222 obtains Layer 3 through Layer 7 routing information concerning the potential security attack on the network. Thus, a more detailed understanding of the mechanisms used to attempt the attack on the network 216 is obtained such that mitigating procedures may be employed closer to the source of the attack. Further, the mitigation instructions may provide mitigation procedures to be applied at any transmission layer of the attacking communications.

In some embodiments, the CAS 222 generates and provides the mitigating instructions based on the routing device to receive the instructions. In other embodiments, however, the CAS 222 generates a generic mitigating instruction in response to the detected security attack on the IP voice network 216. This instruction is then transmitted through an Application Programming Interface (API) that translates the instruction for the one or more routing devices that are to receive the instruction. In this manner, the CAS 222 may generate a single mitigating instruction that is then transmitted to each routing device along the suspected transmission path of the attacking communications through the API. This may reduce the processing load of the CAS 222 to mitigate a potential attack on the network 216.

Figure 5:
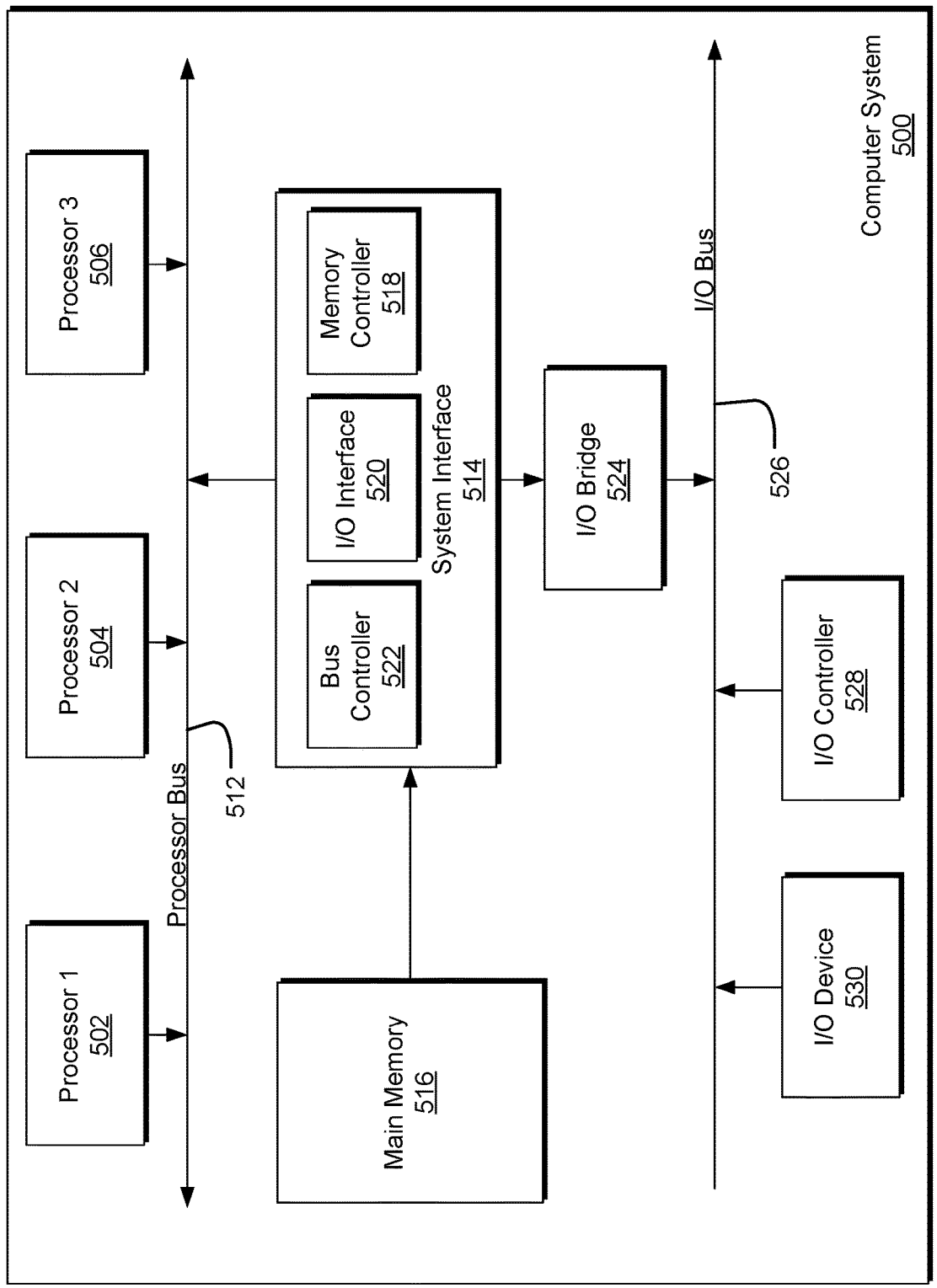
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be the provider edge device discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 540, as illustrated.

I/O device 540 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A telecommunications network comprising:
a first routing device in communication with a first client network in a first geographic location;
a second routing device in communication with a second client network in a second geographic location;
a central analysis system comprising a database of transmission signatures of security attacks on the telecommunications network, the central analysis system configured to:
receive a first Layer 3 through Layer 7 transmission information of a first communication, wherein the first communication is transmitted to the first routing device by the first client network in the first geographic location;
receive a second Layer 3 through Layer 7 transmission information of a second communication, wherein the second communication is transmitted to the second routing device by the second client network in the second geographic location; determine the second Layer 3 through Layer 7 transmission information is received within a particular time period of receiving the first Layer 3 through Layer 7 transmission;
compare the first Layer 3 through Layer 7 transmission information and the second Layer 3 through Layer 7 transmission information to a stored transmission signature in the database;
determine the first Layer 3 through Layer 7 transmission information and the second Layer 3 through Layer 7 transmission information match the stored transmission signature;
determine a security attack occurred on the telecommunications network based on the first Layer 3 through Layer 7 transmission information and the second Layer 3 through Layer 7 transmission information being received within the particular time period and the first Layer 3 through Layer 7 transmission information and the second Layer 3 through Layer 7 transmission information matching the stored transmission signature;
generate at least one mitigating instruction in response to the detected security attack on the telecommunications network, the mitigating instruction including first Layer 3 through Layer 7 transmission information and the second Layer 3 through Layer 7 transmission information for routing a received communication; and
transmit the at least one mitigating instruction to at least one routing device along a transmission path of the security attack on the telecommunications network
wherein the at least one mitigating instruction comprises a Layer 3 through Layer 7 instruction to reroute received communications with the stored transmission signature in the database to a firewall device of the telecommunications network.

2. The telecommunications network of claim 1 further comprising:

a first event logger in communication with the first routing device receiving the first Layer 3 through Layer 7 transmission information of the first communication; and a second event logger in communication with the second routing device receiving the second Layer 3 through Layer 7 transmission information of the second communication.

3. The telecommunications network of claim 2 wherein the central analysis system receives the first Layer 3 through Layer 7 transmission information of the first communication from the first event logger and the second Layer 3 through Layer 7 transmission information of the second communication from the second event logger.

4. The telecommunications network of claim 1 wherein the transmission signature of the security attack comprises a Session Initiation Protocol (SIP) request from a source Internet Protocol (IP) address received at the first routing device and the second routing device, the SIP request comprising identifying information of a source communication device of the security attack on the telecommunications network.

5. The telecommunications network of claim 4 wherein the transmission signature of the security attack further comprises receiving the SIP request from the source IP address at the first routing device in communication with the first client network in the first geographic location and the second routing device in communication with the second client network in the second geographic location within the particular time period.

6. The telecommunications network of claim 4 wherein the transmission signature of the security attack further comprises a destination IP address of a targeted communication device of the telecommunications network.

7. The telecommunications network of claim 1 wherein the at least one mitigating instruction comprises an instruction to reject received communications with the stored transmission signature in the database and the at least one routing device along the transmission path of the security attack comprises the first routing device in communication with the first client network in the first geographic location and the second routing device in communication with the second client network in the second geographic location.

8. The telecommunications network of claim 1 wherein the at least one routing device along the transmission path of the security attack comprises a first provider edge of the first client network and a second first provider edge of the second client network.

9. A method for managing a telecommunications network, the method comprising:
receiving a first Layer 3 through Layer 7 transmission information of a first communication from a first device of a telecommunications network in communication with a first client network in a first geographic location;
receiving a second Layer 3 through Layer 7 transmission information of a second communication from a second device of the telecommunications network in communication with a second client network in a second geographic location different than the first geographic location;
determine the second Layer 3 through Layer 7 transmission is received within a particular time period of receiving the first Layer 3 through Layer 7 transmission;
comparing, at a central analysis system, the first Layer 3 through Layer 7 transmission information and the second Layer 3 through Layer 7 transmission information to a stored transmission fingerprint in a database of known transmission fingerprints of security attacks;
determine the first Layer 3 through Layer 7 transmission information and the second Layer 3 through Layer 7 transmission information match the stored transmission fingerprint;
determine a security attach occurred on the telecommunications network based on the first Layer 3 through Layer 7 transmission information and the second Layer 3 through Layer 7 transmission information being received within the particular time period and the first Layer 3 through Layer 7 transmission information and the second Layer 3 through Layer 7 transmission information matching the stored transmission fingerprint;
generating at least one mitigating instruction in response to the determined security attack on the telecommunications network, the mitigating instruction including Layer 3 through Layer 7 transmission information for routing a received communication; and
transmitting the at least one mitigating instruction to at least one routing device along a transmission path of the security attack on the telecommunications network
wherein the at least one mitigating instruction comprises a Layer 3 through Layer 7 instruction to reroute received communications with the stored transmission signature in the database to a firewall device of the telecommunications network.

10. The method of claim 9 wherein the transmission fingerprint of the security attack comprises a Session Initiation Protocol (SIP) request from a particular source Internet Protocol (IP) address received at the first device in communication with the first client network in the first geographic location and the second device in communication with the second client network in the second geographic location, the SIP request comprising identifying information of a source communication device of the security attack on the telecommunications network.

11. The method of claim 10 wherein the transmission fingerprint of the security attack further comprises receiving the SIP request from the particular source IP address at the first device in communication with the first client network in the first geographic location and the second device in communication with the second client network in the second geographic location within the particular time period.

12. The method of claim 10 wherein the transmission fingerprint of the security attack further comprises a particular destination IP address of a targeted communication device of the telecommunications network.

13. The method of claim 10 wherein the at least one mitigating instruction comprises a Layer 3 through Layer 7 instruction to reject received communications with the stored transmission fingerprint in the database and the at least one routing device along the transmission path of the security attack comprises the first device in communication with the first client network in the first geographic location and the second device in communication with the second client network in the second geographic location.

14. The method of claim 13 wherein the first device receives the first communication from a first client network and the second device receives the second communication from a second client network and the at least one routing device along the transmission path of the security attack comprises a first routing device of the first client network and a second routing device of the second client network.

15. The method of claim 10 wherein the at least one mitigating instruction comprises a Layer 3 through Layer 7 instruction to reroute received communications with the stored transmission fingerprint in the database to a firewall device of the telecommunications network and the at least one routing device along the transmission path of the security attack comprises the first device in communication with the first client network in the first geographic location and the second device in communication with the second client network in the second geographic location.

16. A telecommunication device comprising:
   at least one communication port for communicating with a first routing device coupled to a first client network located in a first geographic location and a second routing device coupled to a second client network located in a second geographic location different than the first geographic location;
   a processing device; and
   a computer-readable medium connected to the processing device configured to store instructions that, when executed by the processing device, performs the operations of:
      receiving a first Layer 3 through Layer 7 transmission information of a first communication from the first routing device;
      receiving a second Layer 3 through Layer 7 transmission information of a second communication from the second routing device;
   determine the second Layer 3 through Layer 7 transmission of the second communication is received within a particular time period of receiving the first Layer 3 through Layer 7 transmission;
      comparing the first Layer 3 through Layer 7 transmission information and the second Layer 3 through Layer 7 transmission information to a stored transmission fingerprint in a database in communication with the at least one processing device;
      determining the first Layer 3 through Layer 7 transmission information and the second Layer 3 through Layer 7 transmission information match the stored transmission fingerprint;
      determining a security attack occurred on the telecommunications network based on the first Layer 3 through Layer 7 transmission information and the second Layer 3 through Layer 7 transmission information being received within the particular time period and the first Layer 3 through Layer 7 transmission information and the second Layer 3 through Layer 7 transmission information matching the stored transmission fingerprint;
      generating at least one mitigating instruction in response to the detected security attack on the telecommunications network, the mitigating instruction including Layer 3 through Layer 7 transmission information for routing a received communication; and
      transmitting the at least one mitigating instruction to at least one routing device along a transmission path of the security attack on the telecommunications network
      wherein the at least one mitigating instruction comprises a Layer 3 through Layer 7 instruction to reroute received communications with the stored transmission signature in the database to a firewall device of the telecommunications network.

17. The telecommunication device of claim 16 wherein the at least one mitigating instruction comprises a Layer 3 through Layer 7 instruction to reject received communications with the stored transmission fingerprint in the database and the at least one routing device along the transmission path of the security attack comprises the first device coupled to the first client network in the first geographic location and the second device coupled to the second client network in the second geographic location.

18. The telecommunication device of claim 16 wherein the first device receives the first communication from a first client network and the second device receives the second communication from a second client network and the at least one routing device along the transmission path of the security attack comprises a first routing device of the first client network and a second routing device of the second client network.

* * * * *